Sept. 10, 1957

R. W. EGGLESTONE 2,806,195

MOTOR STARTING SYSTEM

Filed Jan. 31, 1956

WITNESSES:

INVENTOR
Robert W. Egglestone
BY
ATTORNEY

United States Patent Office 2,806,195
Patented Sept. 10, 1957

2,806,195

MOTOR STARTING SYSTEM

Robert W. Egglestone, Cheektowaga, N. Y., assignor to Westinghouse Electric Corporation, East Pittsburgh, Pa., a corporation of Pennsylvania Application January 31, 1956, Serial No. 562,449

9 Claims. (Cl. 318—229)

My invention relates, generally, to motor starting systems, and, more particularly, to systems for automatically starting electric motors.

An object of my invention, generally stated, is to provide a motor starting system which shall be simple and efficient in operation and which may be economically manufactured and installed.

A more specific object of my invention is to provide a system suitable for starting three-phase, alternating-current motors.

Another object of my invention is to provide a closed transition starting system which advances automatically through a plurality of steps or increments of load on the power distribution system.

A further object of my invention is to utilize the same resistance or reactance units for a plurality of steps in a motor starting system.

Other objects of my invention will be explained fully hereinafter or will be apparent to those skilled in the art.

In accordance with one embodiment of my invention, the stator windings of a three-phase motor are first connected to power lines in delta with a resistor unit in series with each line and another resistor unit in series with each phase winding. The connections are so changed by means of three three-pole contactors that three additional steps or increments of load on the power system are obtained by utilizing the same six resistor units in different combinations. The operation of the contactors after the first step, which is obtained by closing a push button, is controlled automatically by means of timing relays.

For a better understanding of the nature and objects of the invention, reference may be had to the following detailed description, taken in conjunction with the accompanying drawings, in which.

Figure 1:
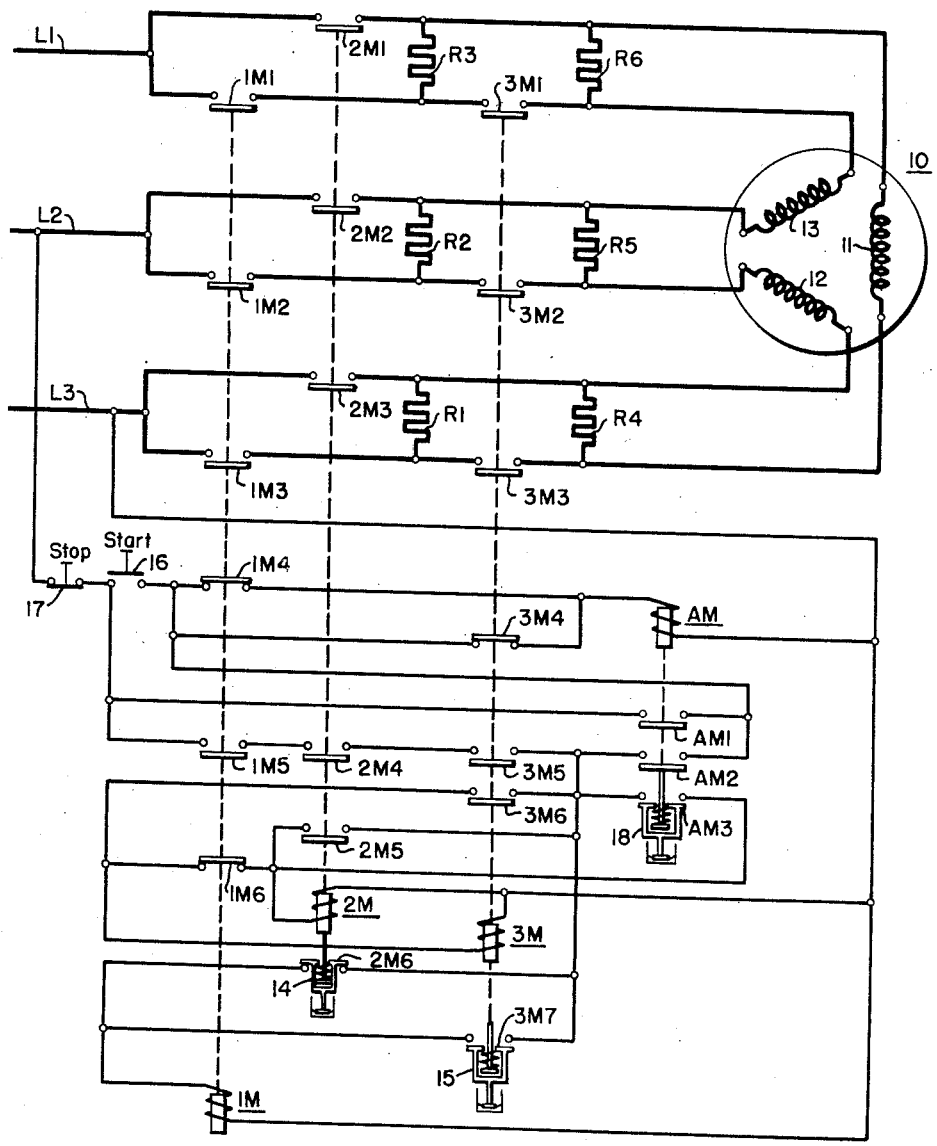
Figure 1 is a diagrammatic view of a motor starting system embodying the principal features of the invention.

Referring to the drawings, and particularly to Fig. 1, the system shown therein comprises a motor 10 which is preferably of the induction type having stator windings 11, 12 and 13 which are connected to power conductors L1, L2 and L3 by means of contactors 1M, 2M and 3M. A plurality of resistor units R1, R2, R3, R4, R5 and R6 are provided for limiting the motor current during starting of the motor.

The contactor 1M has three main contacts 1M1, 1M2 and 1M3. In addition to the main contacts, it also has three auxiliary or interlocking contacts 1M4, 1M5 and 1M6. The contactor 2M has three main contacts 2M1, 2M2 and 2M3. It also has two auxiliary contacts 2M4 and 2M5 which are closed instantaneously upon the energization of its actuating coil. The contactor 2M is provided with a pneumatic timing device 14 which delays the opening of contact members 2M6 for a predetermined time interval after the energization of the actuating coil of the contactor.

The contactor 3M has three main contacts 3M1, 3M2 and 3M3. It also has three auxiliary contacts 3M4, 3M5 and 3M6. The contactor 3M also has a pneumatic timing device 15 which delays the closing of contact members 3M7 for a predetermined time interval after the energization of the actuating coil of the contactor.

In addition to the contactors, a timing relay AM is provided. The relay AM has two contacts AM1 and AM2 which are closed instantaneously upon the energization of the actuating coil of the relay. The relay AM also has a pneumatic timing device 18 which delays the closing of contact members AM3 for a predetermined time interval after the energization of the actuating coil of the relay. It will be understood that a timing relay of another type, such as a relay having a mechanical timing device or an electrical timing device, may be utilized in place of the present relay.

A manually operable "start" push button 16 is provided for starting the motor 10 and a manually operable "stop" push button 17 is provided for stopping the motor. As will be explained hereinafter, the acceleration of the motor 10 is automatically controlled after the closing of the "start" push button 16.

Figure 6:
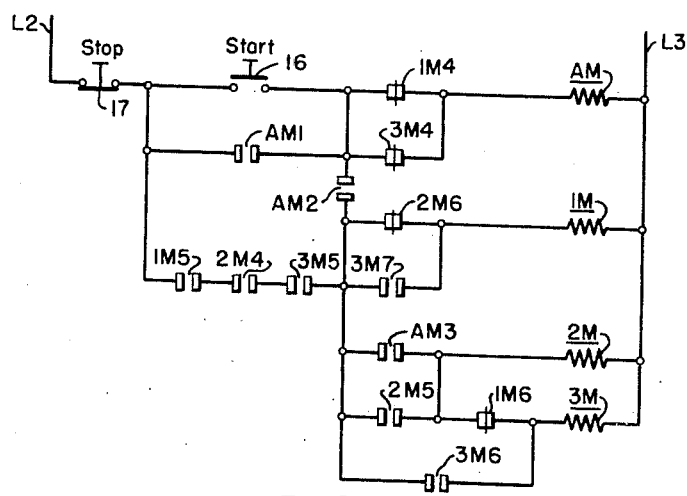
Fig. 6 is a schematic diagram showing the control circuit connections for the motor starting system.

Referring to Fig. 6, it will be seen that when the push button 16 is closed, the actuating coil of the relay AM is energized through a circuit which extends from the power conductor L2 through the "stop" push button 17, the "start" push button 16, normally closed contacts 1M4 of the contactor 1M and the coil AM, to the power conductor L3. Upon the energization of the coil AM, instantaneous contacts AM1 are closed to establish a holding circuit for the coil AM. Instantaneous contacts AM2 are also closed to establish an energizing circuit through normally closed contact members 2M6 to the actuating coil 1M.

Figure 2:
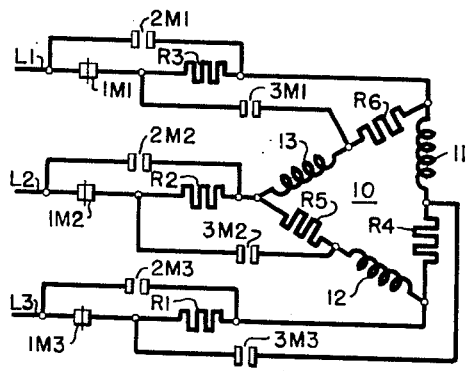
Figs. 2, 3, 4 and 5 are diagrammatic views showing the main circuit connections for different steps of acceleration.

As shown in Fig. 2, when the three main contacts of the contactor 1M are closed, the motor 10 is connected to the power conductors L1, L2 and L3. The resistors R1, R2 and R3 are in series with the line conductors L3, L2 and L1, respectively. The three phase windings of the motors 11, 12 and 13 are connected in delta relation. The resistor R6 is in series with the phase winding 13 and is connected inside the delta. The resistor R4 is in series with the phase winding 11 inside the delta, and the resistor R5 is in series with the phase winding 12 inside the delta. Thus, one resistor unit is in series with each line and one resistor unit is in series with each phase winding.

Upon the expiration of the timing cycle for the relay AM, its contact members AM3 are closed, thereby establishing an energizing circuit for the coil of the contactor 2M. The energization of the coil 2M closes the main contacts of this contactor and starts the timing cycle of its timing device 14.

Figure 3:
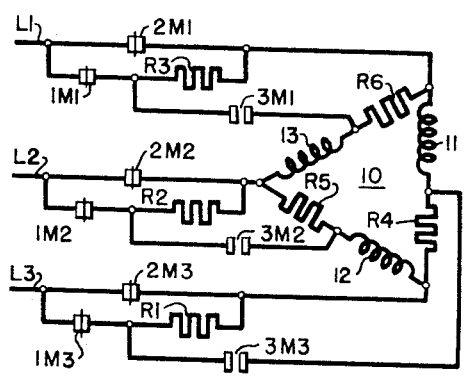
Figure 4:
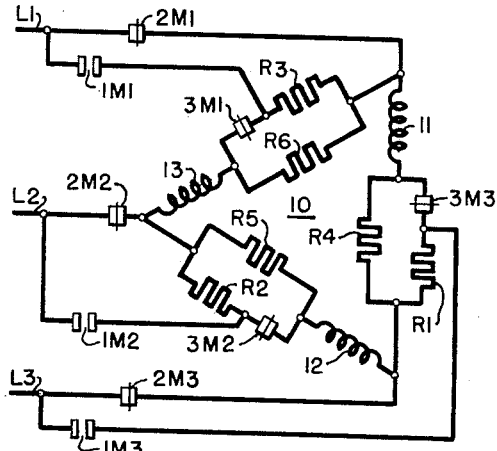

As shown in Fig. 3, the closing of the contacts 2M1, 2M2 and 2M3 shunts the resistors R1, R2 and R3 from the motor circuit. This leaves the resistors R4, R5 and R6 in series with the phase windings of the motor.

Upon the expiration of the timing cycle of the timing device 14 on the contactor 2M, the contacts 2M6 are opened, thereby deenergizing the coil of the contactor 1M which permits this contactor to open. Upon the opening of the contactor 1M, the coil 3M is energized through a circuit which extends through contact members 2M5 and 1M6. A holding circuit for the coil 3M is established through contacts 3M6.

The closing of the main contacts 3M1 connects the resistors R3 and R6 in parallel. The paralleled combination of these two resistors is now in series with the phase winding 13. The closing of the main contacts 3M2 connects the resistors R2 and R5 in parallel and the paralleled combination is in series with the phase winding 12. Likewise, the closing of contacts 3M3 connects the resistors R1 and R4 in parallel and the paralleled combination is in series with the phase winding 11. Thus, another step or increment of load is completed.

Upon the expiration of the timing cycle of the timing device 15 on the contactor 3M, its contacts 3M7 are closed to establish an energizing circuit for the coil 1M, thereby reclosing the contactor 1M. At this time, the coil of the timing relay AM is deenergized since the contacts 1M4 and 3M4 are both open. The instantaneous contacts AM1 and AM2 are opened at this time. However, a holding circuit for the contactors 1M, 2M and 3M is established through the contacts 1M5, 2M4 and 3M5.

Figure 5:
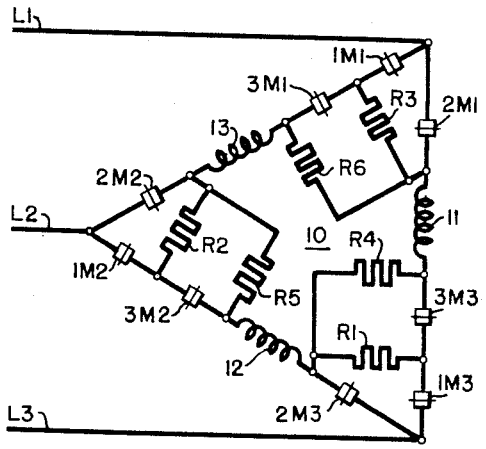

As shown in Fig. 5, the closing of the contacts 1M1, 3M1 and 2M2 connects the phase winding 13 directly across power conductors L1 and L2. The closing of contacts 2M1, 3M3 and 1M3 connects the phase winding 11 directly across power conductors L1 and L3. The closing of contacts 1M2, 3M2 and 2M3 connects the phase winding 12 directly across the power conductors L2 and L3. Thus, the starting sequence is completed.

As previously explained, the holding circuit for the actuating coils of the contactors 1M, 2M and 3M is maintained through the auxiliary contacts 1M5, 2M4 and 3M5 which are connected in series. Therefore, all contactors are opened in case of the failure of the operating coil on any one of the three line contactors. It will also be noted that the main contacts on each contactor carry only the phase current of the motor and not the line current.

The starting resistors R1 to R6, inclusive, may be selected to obtain 25% inrush of current on the first step and 50% inrush on the second step. The resistance of the paralleled combination of these resistors for the third step is determined by the value of the first step and second step of resistance. No adjustment of the resistance for the third step is possible if 25% and 50% currents are desired on the first and second steps, respectively. However, the third step will permit approximately 75% inrush of current which is a desired amount. Therefore, no separate adjustment of resistance is necessary. If reactors are utilized in place of resistors, the current upon the third step is slightly different but is still approximately 75%. Accordingly, satisfactory operation is obtained with either resistors or reactors.

As previously explained, the main contacts of the line contactors are required to carry only the phase current of the motor. Furthermore, the control system is such that all of the resistance units are utilized on the first step, half of the units are utilized on the second step and all units are utilized on the third step of the starting sequence, thereby obtaining an economical utilization of the resistors. Accordingly, a relatively small number of resistor units is required for the number of starting steps obtained. As previously explained, the system operates automatically after the closing of the starting push button. Therefore, it is apparent that the present system has numerous advantages over prior motor starting systems.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a motor starting system, in combination, a motor having three phase windings, switching means for connecting said windings to three power conductors in delta relation, a first reactor unit connected in series with each phase winding, a second reactor unit connected in series with each power conductor, additional switching means for reconnecting said first and second reactor units in the phase winding circuits, and timing relay means for automatically controlling the operation of said additional switching means.

2. In a motor starting system, in combination, a motor having three phase windings, switching means for connecting said windings to three power conductors in delta relation, a first resistor unit connected in series with each phase winding, a second resistor unit connected in series with each power conductor, additional switching means for reconnecting said first and second resistor units in the phase winding circuits, and timing means associated with said additional switching means for automatically controlling the operation of said switching means.

3. In a motor starting system, in combination, a motor having three phase windings, switching means for connecting said windings to three power conductors in delta relation, a first resistor unit connected in series with each phase winding, a second resistor unit connected in series with each power conductor, additional switching means for shunting said second resistor units then connecting them in parallel with the first resistor units in the phase winding circuits and then shunting both resistor units, and timing relay means for controlling the operation of said switching means.

4. In a motor starting system, in combination, a motor having three phase windings, switching means for connecting said windings to three power conductors in delta relation, a first resistor unit connected in series with each phase winding, a second resistor unit connected in series with each power conductor, additional switching means for shunting said second resistor units then connecting them in parallel with the first resistor units in the phase winding circuits and then shunting both resistor units, and timing means associated with said additional switching means for automatically controlling the operation of said switching means.

5. In a motor starting system, in combination, a motor having three phase windings, a first three-pole contactor for connecting said windings to three power conductors in delta relation, a first resistor unit connected in series with each phase winding, a second resistor unit connected in series with each power conductor, a second three-pole contactor for shunting said second resistor units, a third three-pole contactor for connecting the resistor units in parallel in the phase winding circuits, said first contactor being reclosed to shunt both resistor units, and timing means for controlling the operation of said contactors.

6. In a motor starting system, in combination, a motor having three phase windings, a first three-pole contactor for connecting said windings to three power conductors in delta relation, a first resistor unit connected in series with each phase winding, a second resistor unit connected in series with each power conductor, a second three-pole contactor for shunting said second resistor units, a third three-pole contactor for connecting the resistor units in parallel in the phase winding circuits, said first contactor being reclosed to shunt both resistor units, and timing means actuated by the contactors for controlling the operation of said contactors.

7. In a motor starting system, in combination, a motor having three phase windings, a first three-pole contactor for connecting said windings to three power conductors in delta relation, a first resistor unit connected in series with each phase winding inside the delta, a second resistor unit connected in series with each power conductor outside the delta, a second three-pole contactor for shunting said second resistor units, timing relay means for controlling the operation of the second contactor, a third three-pole contactor for connecting the resistor units in parallel in the phase winding circuits inside the delta, said first contactor being reclosed and cooperating with said third contactor to shunt both resistor units, and timing means actuated by said second and third contactors for controlling the operation of said contactors.

8. In a motor starting system, in combination, a motor having three phase windings, a first three-pole contactor for connecting said windings to three power conductors in delta relation, a first reactor unit connected in series with each phase winding, a second reactor unit connected in series with each power conductor, a second three-pole contactor for shunting said second reactor units, a third three-pole contactor for connecting the reactor units in parallel in the phase winding circuits, said first contactor being reclosed to shunt both reactor units, and timing means actuated by the contactors for controlling the operation of said contactors.

9. In a motor starting system, in combination, a motor having three phase windings, a first three-pole contactor for connecting said windings to three power conductors in delta relation, a first reactor unit connected in series with each phase winding inside the delta, a second reactor unit connected in series with each power conductor outside the delta, a second three-pole contactor for shunting said second reactor units, timing relay means for controlling the operation of the second contactor, a third three-pole contactor for connecting the reactor units in parallel in the phase winding circuits inside the delta, said first contactor being reclosed and cooperating with said third contactor to shunt both reactor units, and timing means actuated by said second and third contactors for controlling the operation of said contactors.

No references cited.